United States Patent [19] [11] Patent Number: 4,960,556
Oehlenschlaeger et al. [45] Date of Patent: Oct. 2, 1990

[54] METHOD FOR CRYSTALLIZING THERMOPLASTIC MATERIAL

[75] Inventors: Ulla Oehlenschlaeger; Jan R. Pedersen; Erling Sörensen, all of Odense, Denmark

[73] Assignee: PLM AB, Malmo, Sweden

[21] Appl. No.: 275,536

[22] PCT Filed: Mar. 15, 1988

[86] PCT No.: PCT/SE88/00130
§ 371 Date: Nov. 15, 1988
§ 102(e) Date: Nov. 15, 1988

[87] PCT Pub. No.: WO88/06962
PCT Pub. Date: Sep. 22, 1988

[30] Foreign Application Priority Data

Mar. 17, 1987 [SE] Sweden .............................. 8701088

[51] Int. Cl.$^5$ ..................... B29C 43/04; B29C 43/56
[52] U.S. Cl. ................................. 264/322; 264/292; 264/325; 264/346
[58] Field of Search .............. 264/322, 292, 319, 320, 264/325, 346

[56] References Cited

U.S. PATENT DOCUMENTS

| 4,150,070 | 4/1979 | Chang | 264/328.16 |
| 4,417,320 | 12/1983 | Perkins | 264/292 |
| 4,563,325 | 1/1986 | Coffman | 264/322 |
| 4,564,495 | 1/1986 | Nilsson | 264/235 |
| 4,803,024 | 2/1989 | Nilsson | 264/322 |

Primary Examiner—Jay H. Woo
Assistant Examiner—Jeremiah F. Durkin, II
Attorney, Agent, or Firm—Ladas & Parry

[57] ABSTRACT

Crystallizable mainly amorphous thermoplastic material is crystallized at a temperature exceeding the glass transition temperature of the material (13) by subjecting the material at the elevated temperature to compressive forces. The material thickness as a rule is reduced by at least 20%, preferably by at least 40%. To achieve this a plunger (20) and a mould (30) are moved to a minimum distance at which the thermoplastic material (13) located between the plunger and the mould part is subjected to compressive forces. The plunger and/or the mould part are provided with elements (29, 39) for the setting and maintaining of a temperature specified in advance of the surfaces (23, 33) by which the plunger and the mould part respectively abut against the thermoplastic material.

14 Claims, 4 Drawing Sheets

METHOD FOR CRYSTALLIZING THERMOPLASTIC MATERIAL

FIELD OF THE INVENTION

The present invention relates to a method and apparatus for the crystallizing of thermoplastic material.

DESCRIPTION OF PRIOR ART

It has been known that the mechanical strength of amorphous material can be enhanced by increasing the crystallization of the material. An increasing of the crystallization is linearly related to the density of the material. The increasing of the crystallization is achieved on the one hand through orientation of the material, on the other hand through thermocrystallization of the material.

In the manufacture of articles from plastic material, especially in the mass production of articles, it is necessary to reduce as much as possible the time consumption for the manufacture of each individual article. An example of such applications is the manufacture of containers for the storage of food products. It should be possible to use such containers also in connection with the preservation of food products, for the pasteurization of food products filled into the containers or for the hot filling of food products at a temperature around or over 100° C.

It is known that by orientation of the material and subsequent heat treatment the necessary temperature stability and capacity to withstand increased internal pressure, e.g. during preservation or pasteurization, can be achieved. Similarly, it is known that by thermocrystallization of amorphous material the properties of the material can be improved so that the thermocrystallized material meets the demands arising in the application mentioned earlier. The heat stabilization of oriented material can be done relatively rapidly, since the material as a rule is relatively thin and it therefore acquires an increased temperature over its whole cross-section by heating it for a relatively short time.

The thermocrystallization of amorphous material, on the other hand, is time-consuming owing to the thickness of the material combined with the low thermal conductivity of the material. This in turn leads to undesirably long periods of residence in the production equipment.

SUMMARY OF THE INVENTION

As a result of the present invention the time consumption for the necessary increasing of the crystallization of the amorphous material is appreciably reduced. This is achieved in accordance with the invention in that the material in connection with the abovementioned heating to a temperature exceeding the glass transition temperature (TG) which often is defined as the temperature at which the material starts to soften is also subjected to compressive forces. These are directed as a rule mainly at right-angles to the boundary surfaces of the material.

In a preferred embodiment of the invention the material is enclosed during the compression between mechanical elements which apply compressive forces to the material. In certain applications the mechanical elements are adapted only to provide the specified compressive forces whilst in other applications they are adapted to constitute also moulding elements which transform e.g. the bottom part of a preform to an intermediate form or to an end form in connection with the manufacture of a container and which elements during the moulding process and/or subsequently apply the compressive forces required in accordance with the invention.

The invention is particularly suitable to be applied to the crystallization of the material in the bottom part of containers with a large opening.

In certain applications the material is preheated before the compression to the temperature at which the compression is to take place. In such applications the mechanical element or elements are coated with insulating material. e.g. Teflon, so as to prevent a variation in the temperature of the material during the course of the compression owing to heat exchange with the mechanical element or elements. In other applications the mechanical elements are set to a temperature adapted to the temperature the material should be at during with the compression. The parts of the mechanical elements which abut against the plastic material then as a rule have good thermal conductivity so as by heat exchange with the thermoplastic material set and/or maintain the compression temperature of the material specified in advance.

In the applications where the mechanical moulding elements are at a raised temperature, the latter is set to a value above the glass transition temperature (TG) of the plastic material. The temperature is at a value in the range of, or exceeding, the temperature at which the thermocrystallization of the material is started. As a rule every material has a temperature range within which the thermocrystallization occurs most rapidly. In applications where such material is crystallized, the material temperature as a rule is selected as a value corresponding to this range. This applies correspondingly also to the abutting surfaces of the mechanical elements which, however, in certain applications are given a higher temperature than the temperature of maximum crystallization of the material. As a result the deficient thermal conductivity in the contact surfaces and the effect of the heat gradient which arises in the material during its heating can be eliminated to a certain extent.

In certain applications it is desirable for the material to acquire enhanced crystallization only in limited areas which in certain applications are connected to one another whereas in other applications they are separated from one another.

The significance of the compression forces has been examined in a number of comparative experiments, the results of which are reported below as experiments 1–4.

EXPERIMENT 1

In experiment 1 (see Table 1 below) aluminum plates were moved to abut against a disc of polyethylene terephtalate of a thickness of 1.8 mm. The aluminum plates rested with a slight pressure against the plastic material and without subjecting the same to any compression forces of significance in order to ensure good contact between the aluminum plates and the plastic material. The aluminum plates were kept at a temperature of 140° C. which corresponds to the temperature of the maximum rate of crystallization of PET. The abutting against the thermoplastic material was maintained for the first disc for 10s and was increased thereafter for each subsequent disc by 20s up to a maximum treatment period of 110s. Then the densities of the respective discs were measured. From the results it is evident that a significant increase in the density was achieved only after approximately 70s heating time. Only after a heating time of 110s did the material start to become opaque when a density of 1.360 was measured.

TABLE 1

| Temperature of aluminum plates °C. | Contact time s | Density |
|---|---|---|
| 140 | 10 | 1.342 |
| 140 | 30 | 1.342 |
| 140 | 50 | 1.343 |
| 140 | 70 | 1.346 |
| 140 | 90 | 1.357 |
| 140 | 110 | 1.360 |

EXPERIMENT 2

Corresponding experiments (see Table 2) then were carried out with aluminum plates at a temperature of 150° C. Here the material started to become opaque after approximately 70–90s, which is also evident from the Table. This indicates that the densities here were 1.354 and 1.363, respectively.

TABLE 2

| Temperature of aluminum plates °C. | Contact time s | Density |
|---|---|---|
| 150 | 10 | 1.340 |
| 150 | 30 | 1.340 |
| 150 | 50 | 1.348 |
| 150 | 70 | 1.354 |
| 150 | 90 | 1.363 |
| 150 | 110 | 1.370 |
| 150 | 130 | 1.373 |

EXPERIMENT 3

In experiment 3 (see Table 3) the thermoplastic material was preheated in a bath for 10s. In the first series of experiments the bath temperature was at 130° C. and in the second at 150° C. It was found that the material thereby practically assumed a temperature corresponding to the bath temperature. Subsequently, the discs of thermoplastic material were brought to abutment against the aluminum plates for 10, 30, 50, 70, 90 and 110s respectively. The aluminum plates in the two series at experiments were of the temperatures 130° C. and 150° C. respectively, that is to say the same temperatures as those at which the discs were heated when immersed in the bath. The abutting took place on the one hand without any compression of the material, corresponding to what was described in connection with experiments 1 and 2 above, on the other hand with application of compressive forces which were chosen so that at the actual temperatures the thickness of the material was reduced from approximately 1.8 mm to approximately 0.6 mm.

It is evident from the experimental results that when the bath and the aluminum plates were at a temperature of 130° C. and no compressive forces were used, the material treated acquired a density which substantially corresponded to that of all the discs with a treatment period of up to and including 90s. A minor increase in density was established when the treatment period was 110s. When the temperature of the bath and the aluminum plates was 150° C. the crystallization became more rapid and the material commenced to become opaque after approximately 70s. This is evident also from the value of the density of 1.367 for the time of 70s given in Table 3.

When the material was also subjected to compressive forces, we found at a temperature of bath and aluminum plates of 130° C. a minor increase in density of the material in the discs at the two longest contact periods (90 and 110s). The increase in densities lacks significance insofar as mechanical properties and heat resistance are concerned. The difference between those experimental results when compression forces are lacking and those when they are applied cannot be considered to be of any significance at this temperature.

At 150° C. however, the results strongly differ. Already at a contact time of 10 s an increase in density corresponding to opaque material is achieved. This means, therefore, that the consumption of time for the crystallization of the material is reduced from 70s to 10s, that is to say the consumption of time is reduced to 1/7th.

TABLE 3

| Temperature °C. | | Time seconds | | Density measured | |
|---|---|---|---|---|---|
| bath | Al plates | in bath | against Al plates | without compression | with compression |
| 130 | 130 | 10 | 10 | 1.339 | 1.339 |
| 130 | 130 | 10 | 10 | 1.339 | 1.339 |
| 130 | 130 | 10 | 50 | 1.339 | 1.339 |
| 130 | 130 | 10 | 70 | 1.339 | 1.339 |
| 130 | 130 | 10 | 90 | 1.339 | 1.340 |
| 130 | 130 | 10 | 110 | 1.341 | 1.342 |
| 150 | 150 | 10 | 10 | 1.339 | 1.367 |
| 150 | 150 | 10 | 30 | 1.339 | 1.366 |
| 150 | 150 | 10 | 50 | 1.339 | 1.372 |
| 150 | 150 | 10 | 70 | 1.367 | 1.369 |
| 150 | 150 | 10 | 90 | 1.369 | 1.372 |
| 150 | 150 | 10 | 110 | 1.369 | 1.372 |

EXPERIMENT 4

Subsequently the experiments were repeated (see Table 4) in a further two series, one series designated "Series 4a" and one series designated "Series 4b", with the aluminum plates being held at a temperature of 140° C. and 150° C. respectively. Furthermore, the maximum period of heating was extended to 130s. Otherwise the experimental conditions were unchanged. The plastic material in series 4a and series 4b originated from the same manufacturing batch.

It is evident from Table 4 that at a temperature of 140° C. of the aluminum plates, and without the use of compressive forces notable changes in the density occur after a heating period of 70 to 90 s and a crystallization corresponding to opaque material after a heating period of 110–130s. At a temperature of 150° C. of the aluminum plates the crystallization, and hence the density, increases a little earlier than at the temperature of 140° C. However, the crystallization corresponding to opaque material sets in after approximately the same space of time as at the temperature of 140° C., which is too long a time from a point of view of production.

When the heating was combined with compressive forces, an appreciable increase in the density and hence in crystallization was achieved after 50s at a temperature of 140° C., and at a temperature of the aluminum plates of 150° C. a distinct increase occurred after 30s. The increase after 30s here was of the same magnitude as the increase after 110s without compressive forces, which means that the crystallization time was reduced to approximately ¼.

TABLE 4

| Temperature °C. | | Time seconds | | Density measured | | | |
|---|---|---|---|---|---|---|---|
| | | against | | without compr. | | with compr. | |
| bath | Al plates | in bath | Al plates | Ser 4a | Ser 4b | Ser 4a | Ser 4b |
| 140 | 140 | 10 | 10 | 1.339 | 1.339 | 1.339 | 1.339 |
| 140 | 140 | 10 | 30 | 1.339 | 1.339 | 1.339 | 1.342 |
| 140 | 140 | 10 | 50 | 1.339 | 1.339 | 1.345 | 1.353 |
| 140 | 140 | 10 | 70 | 1.348 | 1.339 | 1.359 | 1.364 |
| 140 | 140 | 10 | 90 | 1.356 | 1.359 | 1.372 | 1.371 |
| 140 | 140 | 10 | 110 | 1.361 | 1.359 | 1.372 | 1.371 |
| 140 | 140 | 10 | 130 | 1.369 | 1.364 | 1.374 | 1.372 |
| 150 | 150 | 10 | 10 | 1.339 | 1.339 | 1.339 | 1.339 |
| 150 | 150 | 10 | 30 | 1.344 | 1.339 | 1.369 | 1.369 |
| 150 | 150 | 10 | 50 | 1.342 | 1.342 | 1.372 | 1.372 |
| 150 | 150 | 10 | 70 | 1.349 | 1.348 | 1.372 | 1.374 |
| 150 | 150 | 10 | 90 | 1.361 | 1.361 | 1.375 | 1.375 |
| 150 | 150 | 10 | 110 | 1.367 | 1.372 | 1.369 | 1.374 |
| 150 | 150 | 10 | 130 | 1.375 | 1.373 | 1.375 | 1.374 |

It is evident from the above account that a heating of the thermoplastic material with simultaneous compression brings about a reduction of the crystallization time. The reduction in the one series of experiments was found to be approximately 4 times and in the second series of experiments it was approximately 10 times. Since in the mass production of articles residence times in production equipment are of great significance in respect of the economy of the manufacture, the reduction of the crystallization time indicated is of great economic significance.

In the application of the invention, as mentioned previously, the compressive forces as a rule are applied towards boundary surfaces of the material owing to the material being enclosed between mechanical elements which during the exertion of compression forces abut against opposite sides of the material. In certain applications, however, only one of the boundary surfaces abuts against a mechanical element, whilst the opposite boundary surface is acted on by pressures bringing about the desired compressive force e.g. by means of a fluid under very high pressure. This latter embodiment is particularly appropriate for application e.g. for the crystallization of material in the bottom part of a container and especially for the crystallization of material in the transition between the bottom part and the side walls of a container body.

In a preferred application of the invention the mechanical elements are provided with raised parts, the height of which is adapted to the thickness of material, so that on compression of the material the material thickness is reduced by at least approximately 20%, preferably by at least approximately 40%. In certain applications the compressive forces are applied only in the region of these raised parts. The regions of plastic material which are subjected to the compressive forces in this latter application are thus surrounded by material which is not acted upon by compressive forces and which, therefore, has substantially lower crystallization.

In applications where material is crystallized e.g. in order to increase the mechanical strength in the adjoining region the compressive forces are applied appropriately in a region which forms bandshaped material portions of stepwise increased length, closed and separated from one another. In certain applications these bandshaped material portions are allowed to form one or more groups of substantially concentrically located annular material portions.

BRIEF DESCRIPTION OF THE FIGURES OF THE DRAWING

The invention is described in more detail in connection with an embodiment there of and in connection with a number of Figures in which.

DETAILED DESCRIPTION OF A PREFERRED EMBODIMENT

Figure 1:
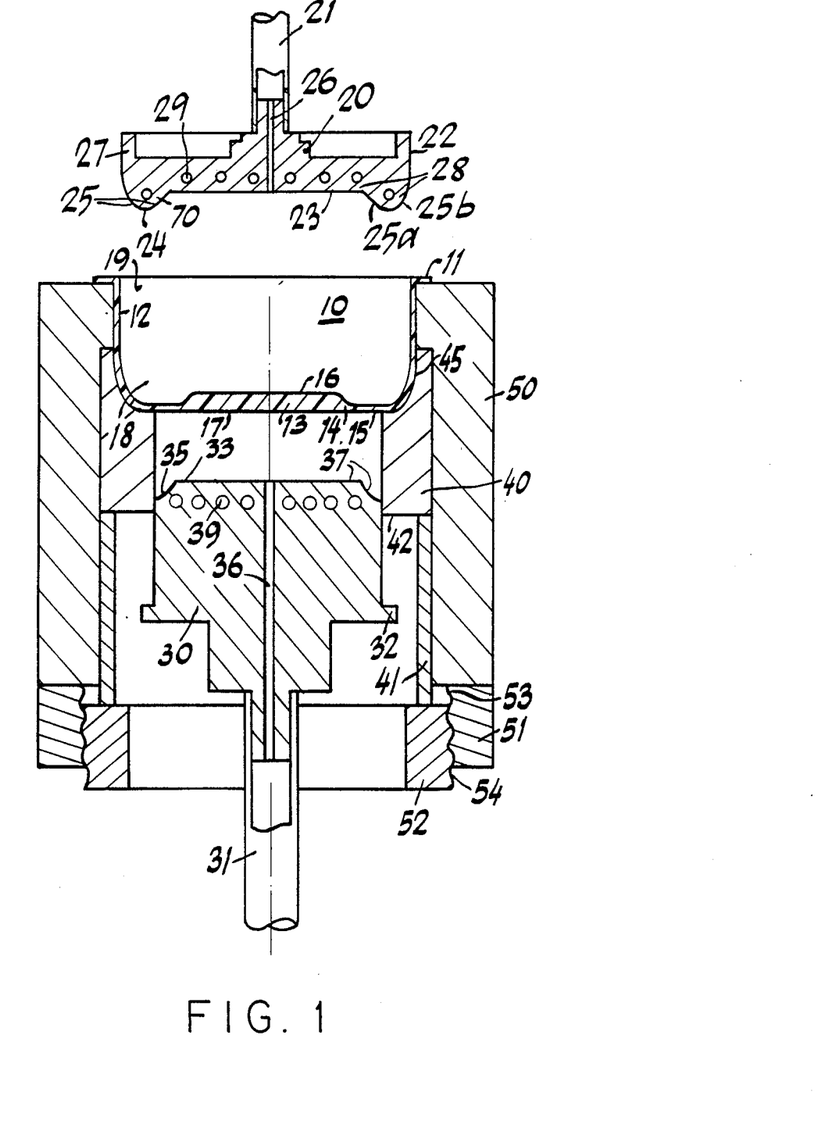
FIG. 1 shows a section of a compression and moulding device in initial position and with a blank placed in the device.
Figure 2:
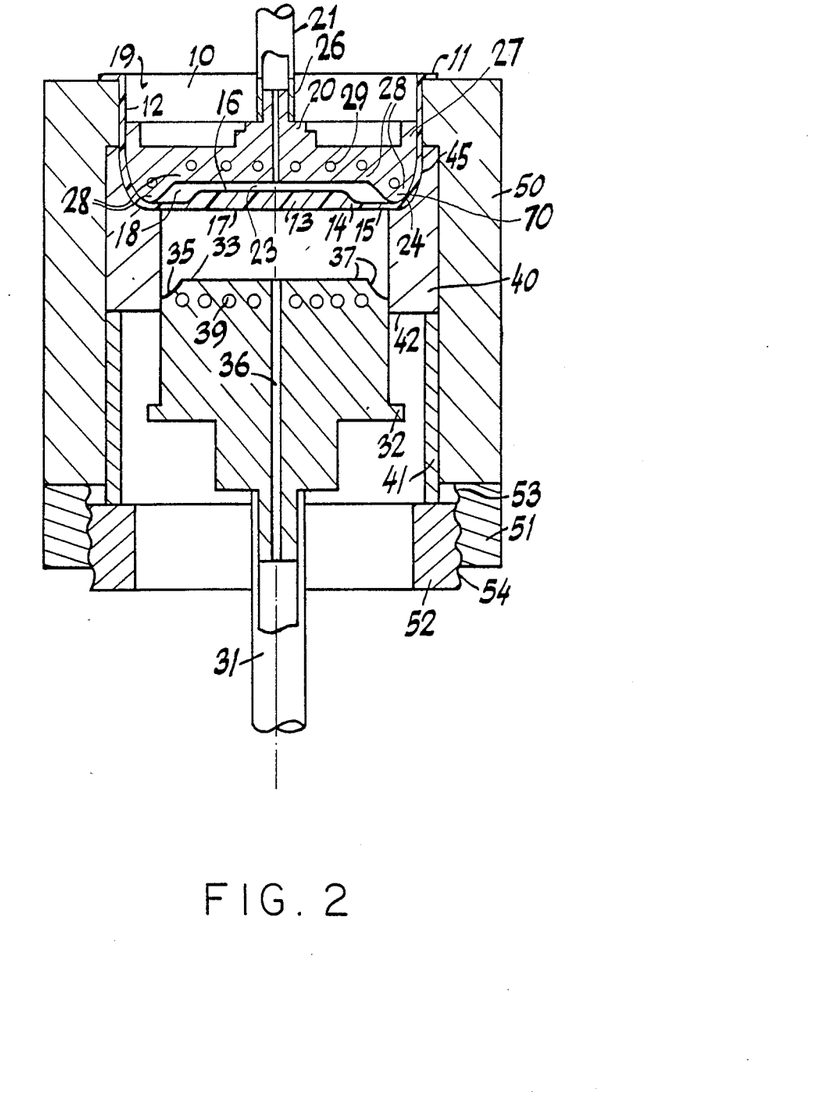
FIG. 2 is a corresponding section with the plunger moved to the working position.
Figure 4:
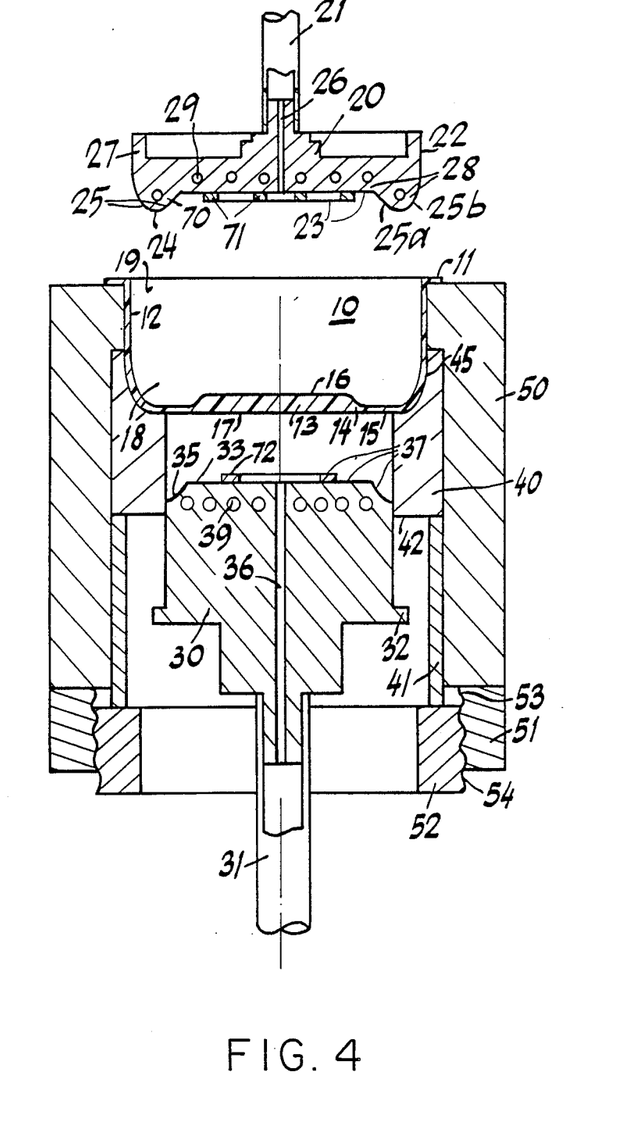
FIG. 4 is a section corresponding to FIG. 1 for a device with moulding surfaces provided with raised parts.

In the FIGS. 1, 2 and 4 can be seen a blank 10 with a bottom part 18, a side wall 12 and an opening part 19 provided with an opening flange 11. The opening flange in the embodiment shown is directed radially from the outwards center axis of the blank. The bottom part consists of a central bottom portion 13 of substantially amorphous material, an annular outer bottom portion 15 of oriented material and a transition 14 between the annular bottom portion 15 and the central bottom portion 13. The outer bottom portion 15 connects the central bottom portion 13 with the side wall 12. In the Figures are also indicated the inner boundary surface 16 and the outer boundary surface 17 of the bottom part.

Figure 3:
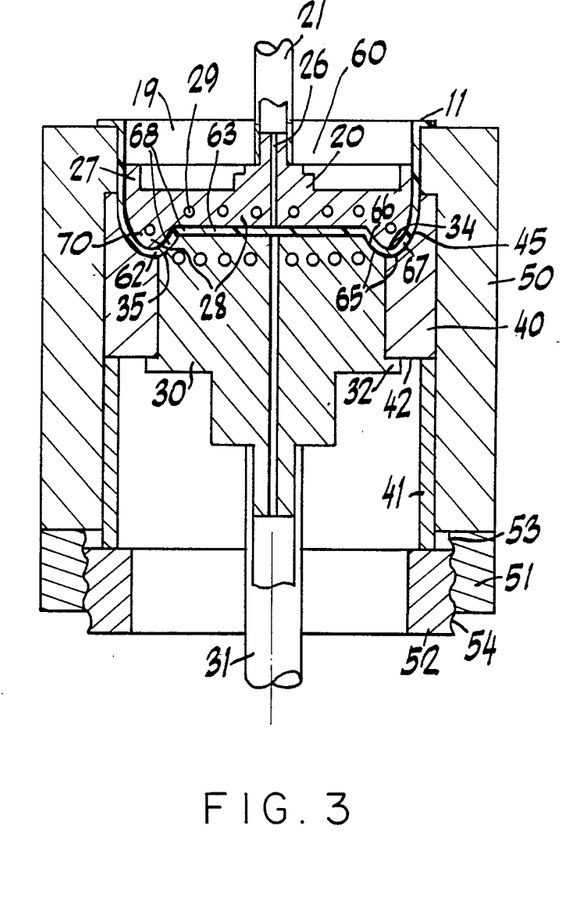
FIG. 3 is a corresponding section with the central mould part moved to its position nearest the plunger.

FIG. 3 shows a cuplike product 60 which has been obtained through moulding of the bottom part of the blank 10. The product has a bottom part 63, opening part 19 and side wall 12. The opening part and the side wall are of a shape substantially in agreement with corresponding parts of the blank 10. The bottom part comprises central bottom portion 63 which via an annular portion 65 of oriented material passes over into the side wall 12. The annular portion 65 has closest to the central bottom portion 63 a downwards-outwards directed portion 66 and an and upwards-outwards directed portion 67 closest to side wall 12. Between the downwards and upwards directed portions 66, 67, an annular portion 65 forms a transition portion 62 intended to abut against the support on which the product is placed when used. The central bottom portion 63 is thus located nearer the opening part of the cuplike product than the transition portion 62.

In FIG. 3 it is seen that in the cuplike product, the material in the central bottom portion 63 substantially corresponds to the material in the central bottom portion 13 of the blank. On moulding of the bottom part 63 of the cuplike product the material volume of the central bottom portion 13 has been substantially maintained. However, the thickness of the central bottom portion 13 has been reduced and its circumference has been increased. On moulding of the bottom portion the material in the central bottom part has been kept at an increased temperature and has been subjected to compressive forces, as a result of which the material has undergone thermocrystallization according to the procedure indicated in the introduction of the description. The technique applied will be described in more detail in the following.

In FIG. 1-4 can also be seen a plunger 20 which is connected to a driving element (not shown in the figures) via a plunger rod 21 for a reciprocating movement between the initial position shown in FIG. 1 and the working position shown in FIG. 2 and 3. Means of stop elements the plunger is adjusted to the correct position in relation to an outer supporting sleeve 50 when the plunger is moved to the working position. The plunger has a lower part 28 and an upper part 27 which are bounded by an outer lateral surface 22, whose shape largely corresponds to the shape of the inner surface of the wall 12 of the blank and of the cuplike product. In its lower part the plunger has a centrally located bottom surface 23 which via a transition surface 25 located in circumferential direction connects to the outer lateral surface 22 of the plunger. The transition surface 25 has closest to the bottom surface 23 a portion 25a directed downwards-outwards from the central bottom surface, and closest to the outer lateral surface 22 of the plunger a portion 25b directed upwards-outwards in relation to the central bottom surface. Between these portions directed downwards and upwards respectively the transition surface has a circumferential connecting portion 24. The downwards and upwards directed portions of the transition surface 25 together with their connecting portions 24 define an annular raised part 70 which surrounds the central bottom surface 23.

In the plunger are provided proximate its bottom surface one or more ducts 29 intended for the transport of a heat transmitting medium. A venting duct 26 opens into the bottom surface 23 of the plunger. In certain applications the bottom surface is provided with a number of openings to which the venting duct is connected.

A central mould part 30 is connected via a central rod 31 to driving elements (not shown in the figures) for reciprocating movement between the initial position shown in FIG. 1 and the position shown in FIG. 3 nearest the plunger 20. A stop boss 32 is provided on the central moulding part. The central mould part, moreover, has one or more ducts 39 for a heat transmitting medium. Reference numeral 37 designates an abutting-/moulding surface of the central mould part. A venting duct 36 opens via one or more openings into the surface 37.

The abutting/moulding surface 37 has a central Portion 33 whose shape is adapted lo the shape of the central bottom surface 23 of the plunger. In the Figures the central portion 33 of the central mould part 30 and the central bottom surface 23 of the plunger respectively shown are of a plane shape, but in other applications the surface are at least partly curved. An annular portion 35 of the abutting/moulding surface 37 directed downwards-outwards from the central portion 33 has a shape adapted to the corresponding portion 25a of the plunger so as to form an annular gap with the corresponding portion 25a of the plunger when the central mould part is in its position closest to the plunger 20 (FIG. 3).

The central mould part 30 is displaced inside an inner supporting sleeve 40 which in turn is supported in a movable manner in the outer supporting sleeve 5O. The inner supporting sleeve has in its upper part an annular surface 45 directed upwards-outwards from its center axis, whose shape corresponds to the shape of the surface 25b of the plunger. With the inner mould part 30 in its position closest to the plunger 20 FIG. 3) the downwards-outwards directed surface 35 of the inner mould part and the upwards-outwards directed surface 45 of the inner sleeve consequently form jointly a moulding and delimiting surface which comprises a connecting portion 34 corresponding to the connecting portion 24 of the plunger. In the gap between these two connecting portions is moulded a transition portion 62 of the cuplike product when the latter is moulded.

The inner supporting sleeve has a stop surface 42 against which the stop boss 32 rests when the central mould part is in the position closest to the plunger. The position of the inner supporting sleeve is determined by a spacer sleeve 41 which in turn cooperates with an inner positioning element 52 for the adjustment of the position of the inner supporting sleeve in relation to the outer supporting sleeve 50. In a preferred embodiment the inner supporting sleeve is fixed detachedly to the spacer sleeve 41. In the Figures the inner positioning element is shown in an embodiment where it is displaced axially in relation to the outer supporting sleeve through cooperation with an outer positioning element 51 which in turn occupies a fixed position in relation to the outer supporting sleeve 50. In the embodiment shown in the Figures this effect is achieved by providing outer positioning element with an internal thread 53 which cooperates with an external thread 54 on the inner positioning element.

In FIG. 4 is shown an embodiment of the invention where the moulding surface of the plunger, that is to say its central bottom surface 23, is provided with raised parts 71 and where the central moulding surface 33 of the central mould part 30 likewise is provided with raised parts 72. Although the plunger as well as the central mould part are shown with raised parts, these are provided in certain embodiments only on the plunger or on the central mould part.

The designations up, down, upwards and downwards respectively used above refer only to the orientation of the device in the drawings and have been used to facilitate understanding of the description. It will be obvious for those versed in the art that on application of the invention the device may have an arbitrary orientation.

When the invention is applied by making use of the embodiments of a device in accordance with the invention shown in FIGS. 1-4, the blank 10 is placed in the position as shown in FIG. 1. Subsequently, the plunger 20 is moved into the position shown in FIG. 2 whereupon the central mould part 30 is moved into the position shown in FIG. 3. The distance between the central bottom surface 23 of the plunger and the central abutting/moulding surface 33 of the central mould part is chosen so that under compression the material in the central bottom part 13 undergoes a thickness reduction. As a rule the thickness is reduced by at least approximately 20% and in some applications by at least approximately 40%. The central bottom surface 23 of the plunger is displaced relatively to the connecting portion 24 of the plunger in a direction towards the interior of the blank by a distance which is adapted to the width (the length in radial direction of the bottom part) of the annular bottom portion 15, so that the material in the portion is given its new shape without the material undergoing any substantial stretching. In the movement towards the end position thus substantially only a compression and redistribution (possibly combined with a change of shape) of the material in the central bottom part 13 of the blank takes place, whereby the central bottom portion 63 of the cuplike product is formed by the moulded material. The bottom portion thus consists substantially of the same material which was incorporated in the central bottom portion 13 of the blank.

As a rule the blank 10 has been heated to an elevated temperature before it is placed into the device in accordance with the invention and generally to a temperature of the order of magnitude of at least 110° C. Heat transmitting medium circulates through the ducts 29 and 39 respectively and maintains the contact surface 23 of the plunger and the abutting/moulding surface 33 of the central mould part respectively at an elevated temperature which is adapted to the material used in the blank so as to achieve the desired increase in the thermal crystallization of the material. In applications where the material consists of polyethylene terephthalate the two surfaces 23 and 33 are maintained at a temperature of at least approximately 140° C. and as a rule at a temperature of at least approximately 150° C. The residence times are chosen according to the extent of crystallization which is to be attained. The Tables 3 and 4 above indicate the required times of treatment in order to obtain the desired thermal crystallization. As a rule the time of treatment is at least 10s.

The shape of the contact surfaces 23 and 33 of the plunger and the central mould part respectively shown in the Figures is adapted according to the desired shape of the product which is to be manufactured and to the quantity of material in the central bottom portion 13 of the blank 10. The length in radial direction (width) of the annular portion 35 of the central mould part directed downwards-outwards from the central moulding surface 33 is adapted in each case to the corresponding radial length (width) of the corresponding portion of the annular outer bottom parts 15 of oriented material of the blanks, whereas the space between the central bottom surface 23 of the plunger 20 and the central moulding surface 33 of the central mould part 30, when these two elements are in the position closest to one another, corresponds to the volume of the central bottom part 13 of the blank of thicker, and substantially nonoriented, material.

In certain applications, as mentioned earlier, the central bottom surface 23 of the plunger and/or the central moulding surface 33 of the central mould part are designed with raised parts 71 and 72 respectively, by means of which the thickness of the region in the central bottom portion 13 of the blank corresponding thereto is reduced during the compression to a greater degree than the thickness of the adjoining material in the central bottom portion. In certain applications the material thickness, though, is reduced only in the regions where the material is acted upon by the raised parts, whereas in other applications a reduction of the material thickness takes place in the region of the raised parts as well as in regions at the side around these. In the product which is manufactured the material wall thus has alternatingly thinner and thicker portions in an arrangement which matches the location of the raised parts on the moulding surfaces 23 and 33 of the plunger 20 and the central mould part 30 respectively.

In certain applications the raised parts form bandlike material portions of stepwise increased length, closed and separated from one another. In a preferred embodiment the raised parts form one or more groups of substantially concentrically located annular material portions.

In a further embodiment the raised parts form one or more groups of annular material portions located substantially concentrically in relation to the center of the bottom of a container.

In yet another embodiment the raised parts are in an arrangement by which compressive forces are applied in a region which forms a central material portion of the bottom part of a container.

In a further embodiment the raised parts are in an arrangement by which compressive forces also are applied in regions which form central material portions for each group of closed bandlike material portions.

The above detailed description has referred only to a limited number of embodiments of the invention, but it will be readily understood by those versed in the art that the invention comprises a large number of embodiments within the scope of the following claims.

What is claimed is:

1. A method of crystallizing and shaping the bottom of a cup which is made of amorphic crystallizable thermoplastic material, said method comprising supporting a cup of thermoplastic material in a mold such that an amorphic bottom of the cup extends across the bottom of an opening in the mold, heating the material of said bottom of the cup to an elevated temperature exceeding the glass transition temperature (TG) thereof wherein the temperature is at least 140° C. applying compressive force to the heated material for at least 10 seconds at said bottom of the cup while said material is at said elevated temperature by applying mechanical pressing elements against said bottom of the cup at opposite surfaces thereof at said bottom of the opening in the mold, the mechanical pressing elements reducing the thickness of said material, terminating the application of compressive force and cooling the material, the amorphic material being crystallized due to heating and pressure while the bottom of the cup is compressed and reduced in thickness by the mechanical pressing elements, the time for the material to become crystallized being shortened compared to crystallization by heating along.

2. A method as claimed in claim 1, wherein the thickness of the material during the compression is reduced by at least 23%.

3. A method as claimed in claim 2 wherein the thickness of the material is reduced by at least 43%.

4. A method as claimed in claim 1 wherein the compressive forces are applied in regions which are at least partly surrounded by material which is not subjected to compressive forces.

5. A method as claimed in claim 1 wherein the compressive forces are applied so that the reduction of thickness in selected regions is greater than in regions surrounding the same.

6. A method as claimed in claim 1 wherein during compression of the material, the material undergoes substantially no stretching.

7. A method as claimed in claim 6 comprising supplying heat to the mechanical pressing elements during compression of the heated material.

8. A method as claimed in claim 1 comprising deforming the shape of the heated material during its compression without substantially affecting the volume of the material.

9. A method as claimed in claim 1, said mechanical pressing elements forming spaced annular bands of material having different degrees of crystallization in said bottom of the cup.

10. A method of as claimed in claim 9 wherein said annular bands are concentrically formed and successively increase in diameter.

11. A method as claimed in claim 10 wherein said bands successively alternate in degrees of crystallization.

12. A method as claimed in claim 1 wherein the bottom of the cup has a thicker central region and a thinner peripheral region, the compression and reduction of the thickness of the material at the bottom of the cup being effected in said central region while squeezed material flows into said peripheral region.

13. A method as claimed in claim 12 comprising shaping said bottom of the cup in said peripheral region during reduction of thickness of said central region to form an annular supporting portion.

14. A method as claimed in claim 1 wherein said thermoplastic material is polyethyene terephthalate.

* * * * *